(12) United States Patent
Robinson et al.

(10) Patent No.: US 9,703,965 B1
(45) Date of Patent: Jul. 11, 2017

(54) SECURE CONTAINERS FOR FLEXIBLE CREDENTIAL PROTECTION IN DEVICES

(71) Applicant: EMC IP Holding Company LLC, Hopkinton, MA (US)

(72) Inventors: Peter Robinson, Enoggera Reservoir (AU); Nikolaos Triandopoulos, Arlington, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 32 days.

(21) Appl. No.: 14/664,338

(22) Filed: Mar. 20, 2015

(51) Int. Cl.
*H04L 9/14* (2006.01)
*G06F 21/60* (2013.01)
*H04L 29/06* (2006.01)
*H04L 9/08* (2006.01)

(52) U.S. Cl.
CPC ............ *G06F 21/602* (2013.01); *H04L 9/085* (2013.01); *H04L 9/14* (2013.01); *H04L 63/0428* (2013.01); *H04L 63/0435* (2013.01)

(58) Field of Classification Search
CPC ...... G06F 12/1408; G06F 21/78; G06F 21/60; H04L 9/14; H04L 9/08
See application file for complete search history.

(56) References Cited

U.S. PATENT DOCUMENTS

| 2002/0071566 A1* | 6/2002 | Kurn | H04L 63/062 380/281 |
| 2012/0198241 A1* | 8/2012 | O'Hare | G06F 21/602 713/189 |

\* cited by examiner

*Primary Examiner* — Izunna Okeke
(74) *Attorney, Agent, or Firm* — Ryan, Mason & Lewis, LLP

(57) ABSTRACT

Techniques are provided for protecting encryption key(s) and other protected material on devices, such as mobile devices. A device stores an encrypted container received from an online authentication service, wherein the encrypted container is encrypted using a first key stored by the online authentication service, wherein the encrypted container comprises a data item stored on the device. The device transmits the encrypted container using an online connection to the online authentication service to decrypt the encrypted container using the first key, wherein the encrypted container is decrypted by the online authentication service to provide a decrypted container only if the online connection satisfies one or more predefined online connection criteria. The device then receives the decrypted container from the online authentication service and obtains the data item from the decrypted container. Online secure containers are also disclosed that are optionally protected using a multi-layer encryption scheme.

27 Claims, 11 Drawing Sheets

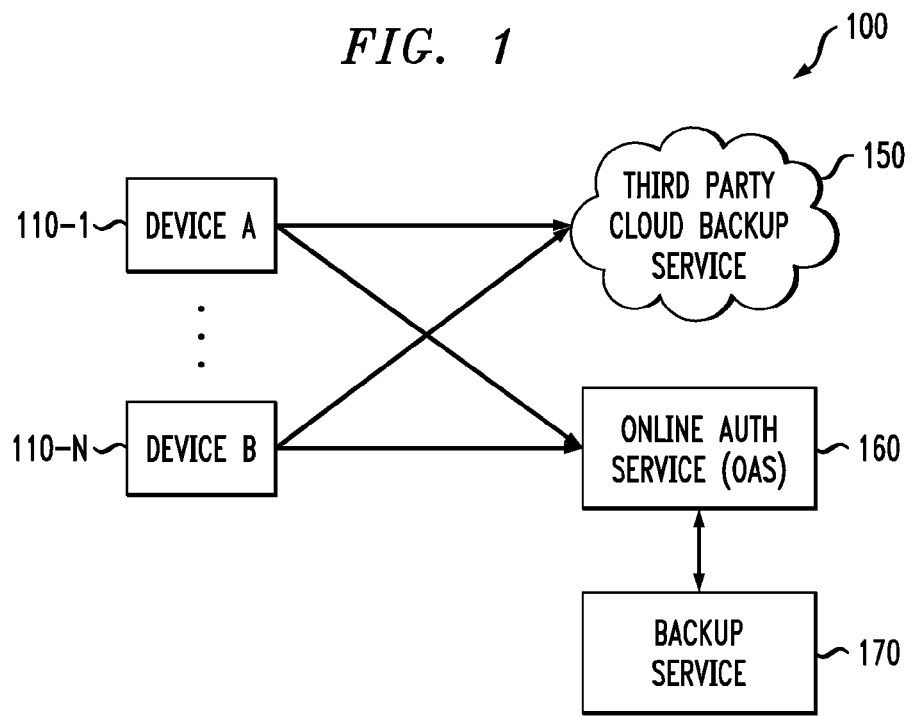
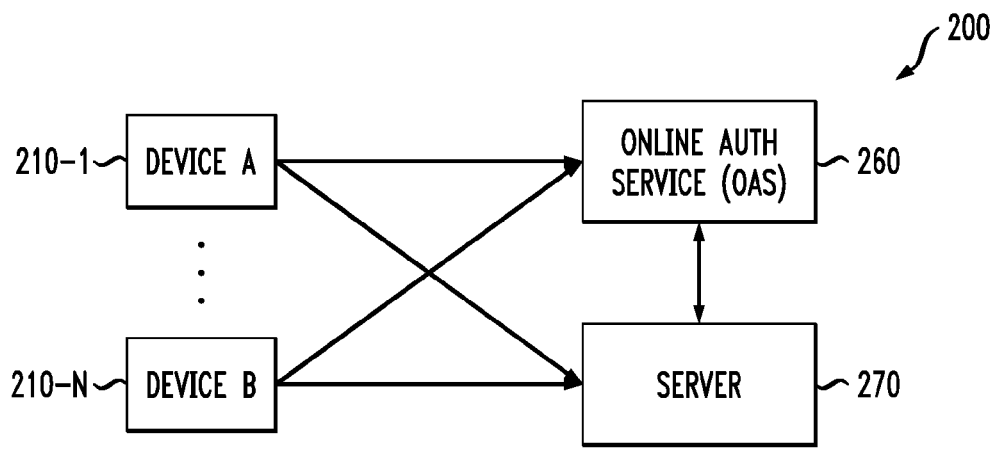

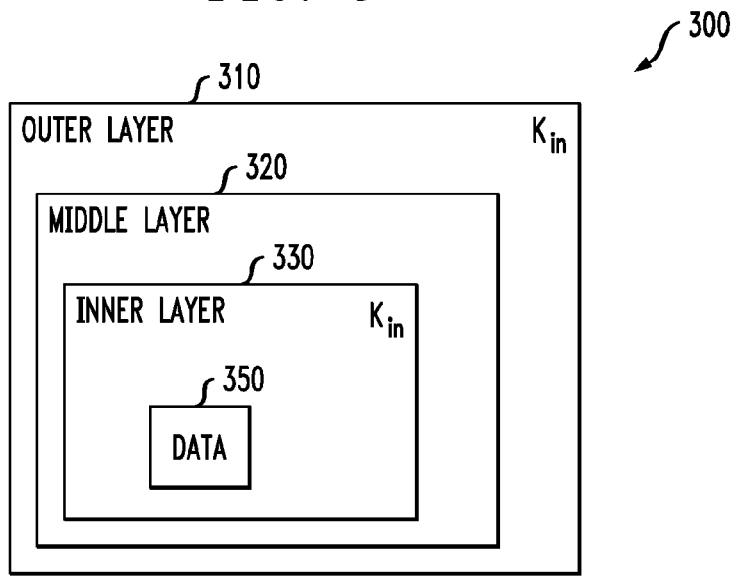
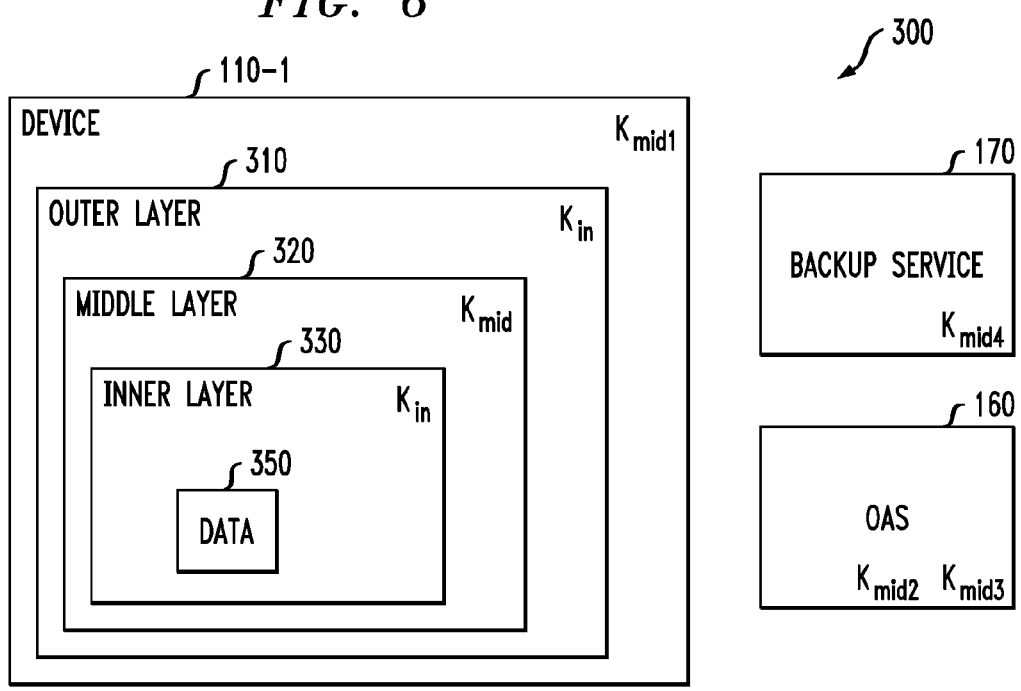

*FIG. 11*

1100 — DEVICE-CENTRIC READ OPERATION

- DEVICE 110
  - EXTRACTS $PK_{out}$ AND $SK_{mid1}$ FROM THE DEVICE KEY STORE
  - DECRYPTS THE ONLINE OUTER CONTAINER USING $SK_{out}$ AND EXTRACT:
    - $K_{in}$
    - ONLINE MIDDLE CONTAINER
    - POSSIBLY THE AUTHENTICATION CREDENTIALS FOR AUTHENTICATION TO OAS
  - POSSIBLY USES AN AUTHENTICATION MEANS TO AUTHENTICATE TO OAS
  - SENDS TO THE OAS:
    - $K_{in}$
    - ONLINE MIDDLE CONTAINER
- OAS 160:
  - CALCULATES $K'_{mid}$ USING SHARES $K_{mid1}$, $K_{mid2}$ AND $K_{mid3}$
  - USES A KEY DERIVATION FUNCTION TO CONVERT $K'_{mid}$ TO THE ACTUAL ONLINE KEY USED $K_{mid}$
  - DECRYPTS THE ONLINE MIDDLE CONTAINER USING $K_{mid}$
    - THE RESULT IS ONLINE INNER CONTAINER
  - RETURNS THE ONLINE INNER CONTAINER TO THE DEVICE
- DEVICE 110
  - DECRYPTS THE ONLINE INNER CONTAINER USING $K_{in}$ AND GET THE PLAINTEXT CONTENTS OF THE ONLINE CONTAINER

DEVICE-CENTRIC WRITE OPERATION
- GO THROUGH THE PROCESS OF THE READ OPERATION 1100 (FIG. 11), THEN:
- DEVICE 110:
  - EXTRACTS $PK_{out}$ AND $K_{mid1}$, FROM THE DEVICE KEY STORE
  - GENERATES A RANDOM $K'_{in}$
  - ENCRYPTS THE PLAINTEXT USING $K'_{in}$
    - THE RESULT IS THE ONLINE INNER CONTAINER
  - SENDS TO THE OAS 160:
    - $K_{mid1}$
    - ONLINE INNER CONTAINER
  - POSSIBLY USES AN AUTHENTICATION MEANS TO AUTHENTICATE TO OAS
- OAS 160:
  - CALCULATES $K'_{mid}$ USING SHARES $K_{mid1}$, $K_{mid2}$ AND $K_{mid3}$
  - POSSIBLY RANDOMLY REFRESHES $K'_{mid}$ AND SHARES $K_{mid1}$, $K_{mid2}$, $K_{mid3}$, $K_{mid4}$ AND SENDS $K_{mid4}$ TO BACKUP SERVICE
  - USES A KEY DERIVATION FUNCTION TO CONVERT $K'_{mid}$ TO THE ACTUAL ONLINE KEY USED $K_{mid}$
  - ENCRYPTS THE ONLINE INNER CONTAINER USING $K_{mid}$
    - THE RESULT IS ONLINE MIDDLE VAULT
  - RETURNS THE ONLINE MIDDLE CONTAINER AND POSSIBLY REFRESHED $K_{mid1}$ TO THE DEVICE
- DEVICE 110:
  - ENCRYPTS THE ONLINE MIDDLE CONTAINER USING $PK_{out}$. PUTS IN THE FINAL ONLINE CONTAINER:
    - (POSSIBLY REFRESHED) $K_{mid1}$
    - ONLINE MIDDLE CONTAINER
    - POSSIBLY THE AUTHENTICATION CREDENTIALS FOR AUTHENTICATION TO OAS
  - STORES THE ONLINE OUTER CONTAINER

CLOUD-CENTRIC READ OPERATION

- DEVICE 210 REQUESTS UNLOCKING OF ONLINE KEY CONTAINER FROM OAS 260 AND A CERTAIN CREDENTIAL OF A CERTAIN ONLINE CONTAINER $i$ FROM SERVER 270.
- OAS 260 VERIFIES RECONSTRUCTION OF MIDDLE LAYER ENCRYPTION KEY AND NOTIFIES SERVER 270 OF SUCCESSFUL AUTHENTICATION.
- SERVER 270 RETURNS ONLINE CONTAINER $i$ (WHICH IS THE CONTAINER CORRESPONDING TO THE REQUESTED CREDENTIAL).
- DEVICE 210 DECRYPTS THE RETURNED INNER LAYER CIPHERTEXT OF ONLINE CONTAINER KEY USING THE DEVICE PRIVATE KEY FOR INNER LAYER AND GETS THE $DEK_i$ FOR ONLINE CONTAINER $i$.
- DEVICE 210 DECRYPTS ONLINE CONTAINER $i$ USING $DEK_i$.

CLOUD-CENTRIC WRITE/UPDATE OPERATION

- DEVICE 210 UNLOCKS ONLINE CONTAINER KEY THROUGH OAS 260 IN A SIMILAR MANNER AS FIG. 13.
- OAS 260 AUTHENTICATES REQUEST OF DEVICE 210 TO SERVER 270.
- THEN:
    - WRITE: DEVICE 210 CREATES A NEW ONLINE CONTAINER N+1 USING THE ONLINE CONTAINER KEY.
    - UPDATE:
        - DEVICE 210 OBTAINS EXISTING ONLINE CONTAINER N IN A SIMILAR MANNER AS FIG. 13.
        - DEVICE 210 UPDATES CONTENTS OF ONLINE CONTAINER N USING ONLINE CONTAINER KEY.
- DEVICE 210 UPLOADS THE ONLINE CONTAINER N OR N+1 TO THE SERVER 270.

SECURE CONTAINERS FOR FLEXIBLE CREDENTIAL PROTECTION IN DEVICES

CROSS-REFERENCE TO RELATED APPLICATIONS

The present application is related to U.S. patent application Ser. No. 14/319,276, filed Jun. 30, 2014, entitled "System and Method for Key Material Protection on Devices Using a Secret Sharing Scheme;" (now U.S. Pat. No. 9,461,821), and U.S. patent application Ser. No. 14/577,206, filed Dec. 19, 2014, entitled "Protection of a Secret on a Mobile Device Using a Secret-Splitting Technique with a Fixed User Share," (now U.S. Pat. No. 9,455,968), each incorporated by reference herein.

FIELD

The present invention relates to the protection of secret keys and other information in devices.

BACKGROUND

Protecting sensitive data that is stored in mobile devices or accessed through mobile devices is a fundamental security problem. Users store, access, process and manage high volumes of personal or enterprise data through their mobile devices, and this data must be protected against leakage to unauthorized parties due to partial or full compromise of the device by an attacker. For example, if a device is lost or stolen, or if the device gets infected by some malicious software, or even if a malicious party gets temporary access to the device, the sensitive data stored in the device or accessed through this device should remain protected. In particular, a user's data should maintain its confidentiality and integrity even when an attacker gains possession of the secret state of the device.

Secure data protection in mobile settings entails certain challenges. On one hand, for better security, data should be hardened by the use of cryptographic tools (e.g., encryption for data confidentiality), wherein strong keys must be generated, used and managed for this purpose. However, these keys must themselves be protected, and key protection in mobile settings introduces more challenges. If keys are stored locally, they are prone to leakage from a possible compromise of the secret state of the device (e.g., after a loss or theft of the device or by installing malware in the device). Alternatively, if the keys are managed through cloud-based services, access to the data protected by the keys is restricted to operational settings that require connectivity to a cloud server in order to retrieve the keys. This may introduce severe performance or usability issues (e.g., for establishing a secure connection with the server).

On the other hand, for better usability, access to data should be controlled in ways that require minimal user involvement and incur no usage distraction. If keys are associated with password-protected credentials, or if keys are replaced altogether by passwords, then security and usability are both negatively affected. Passwords tend to have low entropy and thus are susceptible to dictionary attacks. In addition, the user can be distracted by being asked to frequently enter a password or personal identification number (PIN). Additionally, password-based protection of mobile data limits the possibility for flexible access control structures, since the user cannot remember too many passwords that control access to different types of protected data.

A number of solutions based on secret sharing schemes have been proposed to address some of the above challenges for secure data protection in mobile devices. For example, a number of solutions employ a cryptographically strong key for protecting sensitive data, wherein this key is split into two or more shares dispersed amongst a set of devices (e.g., mobile devices, smart objects and online servers). Access to the data protected by such a split key requires reconstruction of the split key.

Nonetheless, a need remains for improved security techniques for protecting the sensitive data that is stored on devices, such as mobile devices, or that is accessed through such devices.

SUMMARY

Illustrative embodiments of the present invention provide techniques for protecting encryption key(s) and other protected material on devices, such as mobile devices. In one embodiment, a device stores an encrypted container received from an online authentication service, wherein the encrypted container is encrypted using a first key stored by the online authentication service, wherein the encrypted container comprises a data item stored on the device. The device transmits the encrypted container using an online connection to the online authentication service to decrypt the encrypted container using the first key, wherein the encrypted container is decrypted by the online authentication service to provide a decrypted container only if the online connection satisfies one or more predefined online connection criteria. The device then receives the decrypted container from the online authentication service and obtains the data item from the decrypted container.

In one exemplary embodiment, the data item comprises an online container key used to access at least one online container key used to access one or more cloud-centric online containers stored by one or more servers, wherein the one or more cloud-centric online containers store at least one cloud-centric data item.

In another exemplary embodiment, the encrypted container stores data having a first security level and wherein an offline container stores data having a second security level, wherein the first security level is more secure than the second security level, wherein the offline container does not require an online connection that satisfies the one or more predefined online connection criteria.

In another exemplary embodiment, resources are dynamically partitioned into at least two classes based on an access control policy, and wherein the encrypted container provides access to data of a first class and wherein an offline container provides access to data of a second class, wherein the data of the first class is protected by a first security level and the data of the second class is protected by a second security level, wherein the first security level is more secure than the second security level, and wherein the offline container does not require an online connection that satisfies the one or more predefined online connection criteria.

In a further exemplary embodiment, an online authentication service receives a container from a device, wherein the container comprises a data item stored on the device; encrypts the container using a first key stored by the online authentication service to generate an encrypted container; provides the encrypted container to the device; receives the encrypted container from the device for decryption using an online connection; decrypts the encrypted container using the first key to obtain a decrypted container only if the online connection satisfies one or more predefined online connection criteria; and provides the decrypted container to the device.

Embodiments of the invention can be implemented in a wide variety of different devices for the protection of key material or other protected material using online secure containers.

BRIEF DESCRIPTION OF THE DRAWINGS

FIG. 1 illustrates an exemplary network environment in which the present invention may be employed for an exemplary device-centric implementation of the disclosed online secure containers;

FIG. 2 illustrates an exemplary network environment in which the present invention may be employed for an exemplary cloud-centric implementation of the disclosed online secure containers;

FIG. 5 illustrates an exemplary key structure and distribution for inner layer protection of the exemplary online secure container of FIG. 3;

FIG. 6 illustrates an exemplary key structure and distribution for middle layer protection of the exemplary online secure container of FIG. 3;

FIGS. 11 and 12 illustrate exemplary pseudo code for a read operation and a write operation, respectively, for a device-centric online container in accordance with aspects of the invention;

FIGS. 13 and 14 illustrate exemplary pseudo code for a read operation and a write/update operation, respectively, for a device-centric online container in accordance with aspects of the invention;

DETAILED DESCRIPTION

Figure 3:
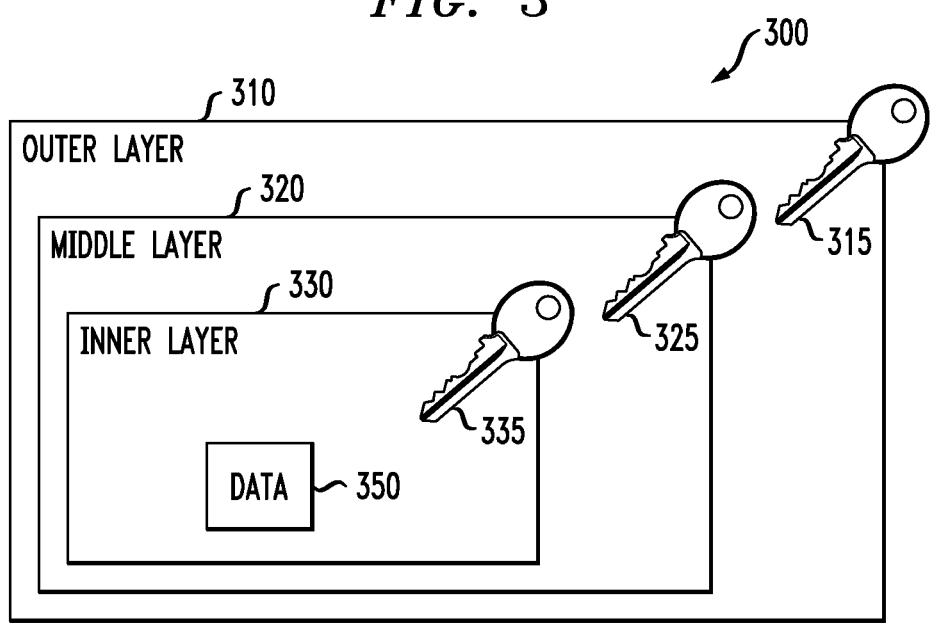
FIG. 3 illustrates an exemplary online secure container that is protected using an exemplary multi-layer encryption scheme.

Illustrative embodiments of the present invention will be described herein with reference to exemplary communication systems and associated servers, clients and other processing devices. It is to be appreciated, however, that the invention is not restricted to use with the particular illustrative system and device configurations shown.

Aspects of the invention provide secure containers that protect the sensitive data that is stored on devices, such as mobile devices, or that is accessed through such devices. Generally, a secure container is a memory module that securely stores data that can be accessed on a device, where data access is restricted by cryptographic means and the contents of the secure container can be read, updated and shared across other devices.

According to one aspect of the invention, the disclosed secure containers can be accessed in online and offline modes. In one exemplary implementation, the cases where the contents of a secure container should only be accessible by the user when his or her mobile device is in an online mode is securely distinguished from the case where such contents can be accessible by the user when his or her device is in an offline mode. For example, a business-critical credential may require that it can be unlocked only when the device is connected to the enterprise network, but without its content being revealed to the enterprise and without the device being able to perform one or more types of replay attack to unlock the same credential at a later time in offline mode.

Techniques are provided for implementing the disclosed secure containers in a number of different exemplary operational settings. In one setting, credentials are managed primarily by the mobile device of the user. In another exemplary setting, credentials are managed by an enterprise or cloud server (through which efficient synchronization of among different devices is facilitated).

According to another aspect of the invention, the disclosed secure containers achieve strong distributed security, where a compromise of a single machine (e.g., a device or server) cannot diminish the security of the container. For example, in one exemplary implementation, key-splitting techniques are employed to ensure strong resilience of the disclosed secure containers against partial device or server compromises.

Key Splitting

As noted above, key-splitting techniques split a cryptographically strong key for protecting sensitive data into two or more shares dispersed amongst a set of devices (e.g., mobile devices, smart objects and online servers). Then, access to data protected by such a split key requires reconstruction of the split key. The split key can be reconstructed by requesting, collecting and cryptographically combining an appropriate subset of such key. Share collection may be further controlled by other user/device authentication and authorization mechanisms (e.g., by using a password to get access to a stored secret share, or as a secret share itself, or by requiring explicit or implicit user authentication before being able to download a share from an online server). If Shamir's (t, n)-threshold secret sharing scheme is used for splitting the key into n shares, a combination of any t, or more, such shares is necessary to reconstruct the key. See, for example, Adi Shamir, "How to Share a Secret," Communications of the ACM, Vol. 22, No. 11, 612-13, (1979), incorporated by reference herein.

U.S. patent application Ser. No. 14/319,276, filed Jun. 30, 2014, entitled "System and Method for Key Material Protection on Devices Using a Secret Sharing Scheme," (now U.S. Pat. No. 9,461,821), discloses a technique based on a "wrapping of shares" for enabling flexible reconstruction policies of keys split using a threshold sharing scheme (e.g., Shamir's scheme) that are more general than just threshold conditions of the form "t out of n".

U.S. patent application Ser. No. 14/577,206, filed Dec. 19, 2014, entitled "Protection of a Secret on a Mobile Device Using a Secret-Splitting Technique with a Fixed User Share," (now U.S. Pat. No. 9,455,968), discloses a technique based on "fixed shares" for enabling flexible reconstruction policies of keys split using Shamir's sharing scheme that allow for the use of one or more user-defined shares (e.g., a password) during key reconstruction.

Collectively, the above three solutions allow for the design of a secure container for protecting mobile data as follows. Data is encrypted using a strong secret key, which may be split into sufficiently many shares, including at least one password share. Then, security is advanced by distributing shares to the appropriate entities and achieving better intrusion resilience, and usability is advanced by allowing flexible reconstruction policies that may be user-transparent depending on the operational context. For example, if a (2, 3) threshold scheme is employed with one password share (derived by a password remembered by the user), one device share (stored at the device) and one server share (stored at an online server), then security is hardened because an attacker needs to compromise both the device and the server, or one of the two and guess the user's password, in order to gain unauthorized access to the user's data. Also, usability is improved by allowing user-agnostic data access, through reconstruction of the key, performed at the device, using the device and server shares, when the device is online (i.e., has network connectivity with the online server), while still allowing undisrupted data access in cases the device is offline (e.g., while operating in "airplane" mode), through reconstruction, performed at the device, using the password and the device shares.

However, the above approach suffers from one or more limitations. Since key reconstruction happens on the device, an attacker that comprises the device, even partially, may intercept the server share after it is fetched from the online server (prior to a key reconstruction performed while the device is online). This affects the security of the container, since the attacker then only needs to get access to the device share in order to gain unauthorized access to the protected data, presumably an easy task since the attacker has compromised the device. Thus, distributed security is diminished. Additionally, the two reconstruction modes, online and offline modes, provide only usability differentiation, but not security differentiation. That is, the way that the key is reconstructed carries no access control significance. Since the server share is retrieved by the online server, the server share can easily be cached at the device, and therefore the online reconstruction can be "replayed" even while the device is offline. Thus, there is no cryptographic guarantee about which reconstruction, online or offline, has produced the key once this has been successfully reconstructed. Thus, access differentiation is not supported.

In one exemplary implementation, the disclosed secure containers (i) can be accessed in both online and offline modes, through an online reconstruction or, respectively, an offline reconstruction; (ii) achieve strong distributed security, where no simple machine (device or server) compromise diminishes the security of the container; and (iii) provide both usability differentiation and security differentiation, where online reconstructions are provably verified. Additionally, the disclosed secure containers optionally provide the above properties in settings where the container needs to be stored at a cloud server offered by a cloud service provider.

According to a further aspect of the invention, an online secure container is provided that (1) can be accessed only when the device is online; (2) provides online key reconstruction, or generally online content unlocking, that is jointly performed by the device and an online server in a way that is resilient to one or more types of replay attacks; and (3) offers a cryptographically enforced attestation that access to its protected data is granted while the device is online. In one exemplary embodiment, the disclosed online secure containers can be configured to employ no explicit key splitting via a secret sharing scheme but still achieve strong distributed security via a secure joint protocol run between the device and the online server.

One aspect of the invention provides online secure containers that are either device-centric, meaning that they are stored at the device and managed locally by the host device, or cloud-centric, meaning that they are stored at a server of a cloud provider and managed remotely by the host device.

The online secure containers presented herein can be applied, for example, to the protection of credentials managed by mobile devices that operate in enterprise settings. The user's credentials can be themselves keys that protect different types of data or control the functionality allowed on different types of applications running on the device. The credentials can optionally be partitioned into two types: standard credentials and highly secure credentials. Standard credentials that protect standard sensitive data can be accessed when the device is either in an online or offline mode, offering security. Highly secure credentials that protect highly sensitive data can be accessed only when the device is provably online through a provided cryptographic attestation that the device is, indeed, online, communicating with a special enterprise online server during unlocking of the online secure container, thus offering higher security.

In this manner, the disclosed secure containers allow for more flexible cryptographically enforceable access control policies on data accessed by mobile users, and for more secure service levels, under the assumption that connectivity (and correct interaction) with a designated online server in an enterprise imposes a safer operation mode for a mobile device. For example, a device gets remote access to an enterprise data center where critical business information is stored only when the device is connected through a certain network in a certain building to this designated online server.

Existing approaches on secure containers do not differentiate between online and offline modes of operations of the user's mobile device and do not provide cryptographic mechanisms for enforcing a secure separation between these two modes. Therefore, one advantage of the disclosed secure containers is that they provide a useful novel technique for cryptographically enforcing a separation between offline and online modes of operations of the user's device with respect to the management of credentials.

Secure Container Models

Consider an abstraction of a secure container as a memory module that can store data that is accessed by a user operating on a device. Each container can be considered to store a fixed data unit. Access to the stored data is restricted via cryptographic means in order to read, update and share data. Typically, data is protected through encryption under a secret key, and granting access to this data is equivalent to fetching or reconstructing this secret key.

Each secure container grants access depending on whether certain criteria are met. In one exemplary embodiment, any secure container must, in particular, require that the user or the device or both have been authenticated by the module of the secure container or by a third-party application according to certain authentication factors. Authentication may be based on passive means (e.g., by leveraging behavioral scores) or active means (by leveraging passwords or PINs).

As used herein, an offline secure container imposes no additional requirements or criteria in granting access to its contents other than one or more authentication factors. In one exemplary embodiment, an offline secure container may be implemented as a symmetric key encryption of the data, where the encryption key is split through a (2, 3) threshold secret sharing scheme, so that one such share is fixed (and depends on the user's secret input, e.g., a password). See, for example, U.S. patent application Ser. No. 14/577,206, filed Dec. 19, 2014, entitled "Protection of a Secret on a Mobile Device Using a Secret-Splitting Technique with a Fixed User Share," (now U.S. Pat. No. 9,455,968), each incorporated by reference herein.

As used herein, an online secure container, on the other hand, in addition to one or more authentication factors, imposes the requirement that the device is provably online while having connectivity with an Online Authentication Service (OAS), as discussed further below in conjunction with FIGS. 1 and 2. The OAS server is designated to facilitate the unlocking of the stored contents of the online secure container. Here, a device is provably online when, in addition to basic network connectivity with the OAS server, the device interacts with the OAS server in a specific way that provides a secure attestation that this interaction is correct and fresh, according to predefined "online connection" criteria. Optionally, this interaction with the OAS server may contribute to establishing user or device authentication via one or more authentication factors.

For example, the OAS server may be a designated online server in an enterprise that has the role of facilitating secure access control over enterprise resources that are accessed through corporate or personal mobile devices of employees. Those contents stored in an online secure container then can only be accessed when an employee's device interacts with the OAS server in a way that (i) the OAS server verifies some authentication factors about the user/device, and (ii) the secure container verifies correct and fresh interaction with OAS, based on the predefined online connection criteria.

As discussed further below in conjunction with FIG. 1, a secure container stored at the device is referred to as device-centric. As discussed further below in conjunction with FIG. 2, a secure container stored at a cloud server (of a cloud server provider) is referred to as cloud-centric. Device-centric containers may be further backed-up at one or more cloud servers (of cloud server providers) and may be unlocked in a recovery mode (e.g., when the mobile device was lost or wiped) through interaction with an additional Backup Service run by another (cloud-hosted or locally hosted) enterprise server.

Generally, the disclosed online secure containers employ a provable online key reconstruction (or content unlocking method) where an essential step of this unlocking operation is to outsource to the OAS server a cryptographic operation that is necessary for the content unlocking. In one exemplary embodiment discussed further below in conjunction with FIG. 3, the content protection mechanism of the exemplary online secure container 300 (FIG. 3) is structured to comprise three layered encryptions of the protected data, where the encryption key of the middle layer encryption is possessed by the OAS server. The inner and outer layers of encryptions are optional in the sense that they are not required for achieving the property of provable online access, but they enhance security with respect to data confidentiality. Optionally, the middle layer encryption key possessed by the OAS server is a split key with shares dispersed among the device, OAS and the Backup Service.

Device-Centric and Cloud-Centric Online Containers

FIG. 1 illustrates an exemplary network environment 100 in which the present invention may be employed for an exemplary device-centric implementation of the disclosed online secure containers. Generally, for a device-centric implementation, the online secure containers are stored on a given device and are backed up to the Cloud. Device-centric online secure containers typically store secrets that pertain to the given device. For example, a device-centric online secure container for a particular mobile device would store secret data for the mobile applications operating on the given mobile device.

As shown in FIG. 1, two exemplary devices A and B from a plurality of devices 110-1 through 110-N, such as mobile phones and/or tablets, are connected over a network (not shown) to a third party cloud backup service 150, such as the iCloud® cloud storage and cloud computing service from Apple Inc. Generally, the third party cloud backup service 150 performs a backup of one or more of the exemplary devices 110-1 through 110-N, including any online container(s) that may be present on such devices 110-1 through 110-N.

In addition, the two exemplary devices 110 are connected over a network (not shown) to an OAS server 160 that facilitates the online secure containers disclosed herein. The exemplary OAS server 160 facilitates the unlocking of the stored contents of the online secure container. As noted above, a device 110 is provably online when, in addition to basic network connectivity with the OAS server 160, the device 110 interacts with the OAS server 160 in a specific way that provides a secure attestation that this interaction is correct and fresh, according to predefined "online connection" criteria.

An optional backup service 170 enables a recovery of a device-centric online secure container, stored at a particular device 110 and backed up at the third party cloud backup service 150, in case of a loss of this device, where the recovery happens at the OAS server 160 on request of the user of the device. An exemplary such recovery is described later.

FIG. 2 illustrates an exemplary network environment 200 in which the present invention may be employed for an exemplary cloud-centric implementation of the disclosed online secure containers. Generally, for a cloud-centric implementation, the online secure containers are stored on a server and are retrieved when used in an online mode of operation, as discussed further below in conjunction with FIG. 8. Typically, cloud-centric online secure containers store secrets that need to be shared across devices. For example, a given cloud-centric online secure container might store a user name and password.

As shown in FIG. 2, two exemplary devices A and B from a plurality of devices 210-1 through 210-N, such as mobile phones and/or tablets, are connected over a network (not shown) to an OAS server 260 that allows access to the online secure containers disclosed herein. The exemplary OAS server 260 facilitates the unlocking of the stored contents of the online secure container, in a similar manner as the OAS server 160 of FIG. 1. As noted above, a device 210 is provably online when, in addition to basic network connectivity with the OAS server 260, the device 210 interacts with the OAS server 260 in a specific way that provides a secure attestation that this interaction is correct and fresh, according to predefined online connection criteria.

In addition, the two exemplary devices 110 are connected over a network (not shown) to a server 270 that stores the online containers, as discussed further below in conjunction with FIG. 9.

Multi-Layer Encryption of Online Secure Containers

FIG. 3 illustrates an exemplary online secure container 300 that is protected using an exemplary multi-layer encryption scheme. As shown in FIG. 3, and as discussed further below in conjunction with FIG. 12, data 350 to be protected by the online secure container 300 at a device 110 is first encrypted by the device 110 using an inner layer encryption 330 with an inner key 335 to generate an online inner container. The online inner container is then sent by the device 110 to the OAS server 160, where a middle layer encryption 320 is applied to the online inner container using a middle key 325 to generate an online middle container. The OAS server 160 sends the online middle container to the device 110. The device 110 applies an outer layer encryption 310 to the online middle container using an outer key 315 to generate the final online secure container 300. Communications between the device 110 and the OAS server 160 may be secured in order to protect the integrity and confidentiality of the exchanged data.

In this manner, as noted above, in at least one exemplary embodiment, the content protection mechanism of the exemplary online secure container 300 (FIG. 3) is structured to comprise three layered encryptions 310, 320, 330 of the protected data 350, where an encryption key 325 of the middle layer encryption 320 is possessed by the OAS server 160, as discussed further below in conjunction with FIG. 4. The inner layer encryption 330 and the outer layer encryption 310 managed by the device 110 are optional in the sense that they are not required for achieving the property of provable online access, but they enhance security with respect to data confidentiality. Optionally, the middle layer encryption key 325 possessed by the OAS server is a split key with shares dispersed among the device, OAS and the Backup Service, as discussed further below in conjunction with FIG. 6.

Since the middle key 325 needed for the middle layer decryption of the online middle container is held, at least in part, only by the OAS server 160, then the unwrapping of the middle layer encryption 320 is effectively "outsourced" to the OAS server 160. In this manner, an online secure container 300 is provided that can only be unlocked if the device 110 is online, as defined by predefined online connection criteria.

Figure 4:
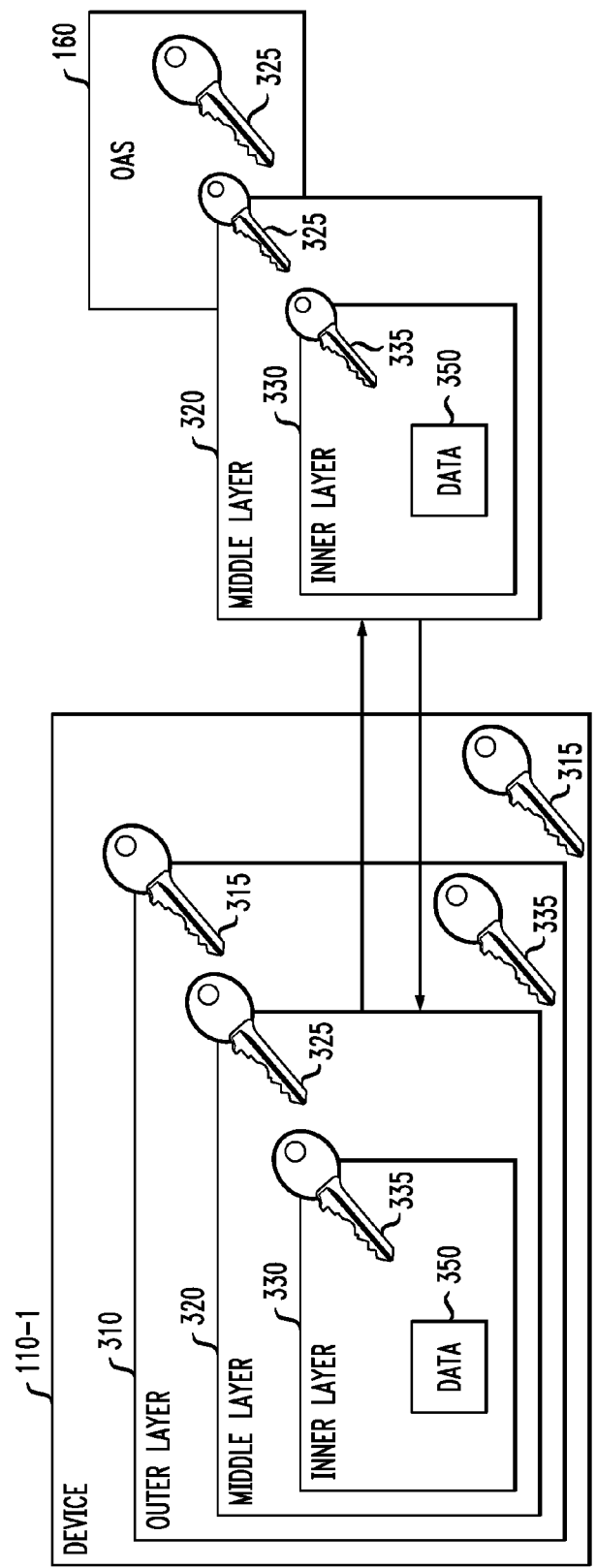
FIG. 4 illustrates an exemplary technique for reading data from an online secure container that is protected using the exemplary multi-layer encryption scheme of FIG. 3.

FIG. 4 illustrates an exemplary technique for reading data from an online secure container 400 that is protected using the exemplary multi-layer encryption scheme of FIG. 3. In order to access the online middle container, the device 110 must first remove the optional outer layer encryption 310 using the outer key 315 stored on the device 110, as discussed further below in conjunction with FIG. 7.

As noted above, unwrapping of the middle layer 320 is effectively "outsourced" to the OAS server 160 and can only be unlocked if the device 110 is online, as defined by predefined online connection criteria, as discussed further below in conjunction with FIG. 6. Generally, the online middle container is sent by the device 110 to the OAS server 160. The OAS server 160 unwraps the middle layer encryption 320 from the online middle container using the middle key 325 stored by the OAS server 160. The unwrapped online inner container is then returned to the device 110.

In order to access the data 350 in the online inner container, the device 110 must first remove the optional inner layer encryption 330 using the inner key 335 stored on the device 110, as discussed further below in conjunction with FIG. 5. The data 350 is then available for use.

FIG. 5 illustrates an exemplary key structure and distribution for inner layer protection 330 of the exemplary online secure container 300. As noted above, the inner layer protection 330 is managed by the device 110 and the inner key 335 (e.g., a symmetric key $K_{in}$) needed to unwrap the data 350 is stored on the device 110 as part of the data protected by the outer layer 310 and is only accessible to the device 110. The exemplary symmetric key $K_{in}$ can be randomly generated at the device 110 (e.g., using the Advanced Encryption Standard (AES)). In one exemplary embodiment, the data 350 would be authenticated by employing an authenticated encryption scheme in one or more of the layer encryptions.

Generally, the inner layer protection 330 is optionally applied to the data 350, for example, to conceal the data 350 from the OAS server 160. In this manner, plain text data is not accessible to the OAS server 160.

The inner layer encryption key $K_{in}$ may itself optionally be split into two or more shares to add additional security to the online secure container 300. For instance, $K_{in}$ may be split in a similar manner as the key splitting performed to protect the contents of an offline container using an exemplary (2, 3) threshold secret sharing scheme, where two out of three shares are sufficient to reconstruct $K_{in}$, as described above for offline containers in the section entitled Secure Container Models. If these three shares correspond to the device share $K_{in1}$, a password share $K_{in2}$ (see U.S. patent application Ser. No. 14/577,206, filed Dec. 19, 2014, entitled "Protection of a Secret on a Mobile Device Using a Secret-Splitting Technique with a Fixed User Share", now U.S. Pat. No. 9,455,968) and server share $K_{in3}$ (possibly stored at the OAS server 160), then $K_{in}$ can be reconstructed either in offline mode by combining $K_{in1}$ and $K_{in2}$, or in online mode by combining $K_{in1}$ and $K_{in3}$, where $K_{in3}$ is provided to the device 110 along with the middle layer ciphertext in the case where the server share $K_{in3}$ is stored at the OAS server 160. Accordingly, the device share $K_{in}$ is stored as content protected by the outer layer ciphertext of the container (where an inner key $K_{in}$ that is not split would normally be stored). Alternatively, the above splitting configuration can be achieved by protecting the inner layer encryption key $K'_{in}$ as the content of an offline container, that is, encrypted by another key $K_{in}$ which is then split into three shares as above, where $K_{in1}$ is stored as content of the outer layer ciphertext of the container.

FIG. 6 illustrates an exemplary key structure and distribution for middle layer protection 320 of the exemplary online secure container 300. In the exemplary embodiment of FIG. 6, key splitting techniques are optionally applied on the middle key 325 (e.g., a symmetric key $K_{mid}$) to require the device 110 and the OAS server to cooperate to open the online secure container 300. The exemplary symmetric key $K_{mid}$ can be randomly generated by the OAS server 160 (e.g., using AES).

In the exemplary embodiment of FIG. 6, where key splitting techniques are applied to the middle key 325, the exemplary middle key $K_{mid}$ is split into shares $\{K_{mid1}, \{K_{mid2}, K_{mid3}\}, K_{mid4}\}$ stored respectively in the key store of the device 110, the OAS server 160 and the backup service 170. The exemplary middle key $K_{mid}$ is reconstructed at the OAS server 160 using $\{K_{mid2}, K_{mid3}\}$ and either $K_{mid1}$ from the device 110 in a normal mode, or $K_{mid4}$ from the backup service 170 in a recovery mode. In this manner, the OAS server 160 and the backup service 170 individually cannot reconstruct the exemplary middle key $K_{mid}$. In addition, "replay" or "man in the middle" attacks during an "offline" mode of operation are prevented since split key reconstruction requires the participation of the OAS server 160.

For a more detailed discussion of suitable key splitting techniques, see, for example, U.S. patent application Ser. No. 14/319,276, filed Jun. 30, 2014, entitled "System and Method for Key Material Protection on Devices Using a Secret Sharing Scheme;" (now U.S. Pat. No. 9,461,821), and/or U.S. patent application Ser. No. 14/577,206, filed Dec. 19, 2014, entitled "Protection of a Secret on a Mobile Device Using a Secret-Splitting Technique with a Fixed User Share," (now U.S. Pat. No. 9,455,968), each incorporated by reference herein.

Generally, the middle layer protection 320 enforces collaboration among the OAS server 160 and either the device 110 or the backup service 170. As noted above, since the middle key 325 is needed for the middle layer decryption of the online middle container and the middle key 325 is, held, at least in part, only by the OAS server 160, then the OAS server 160 must participate in the unwrapping of the middle layer encryption 320. Thus, the online secure container 300 can only be unlocked if the device 110 is online with the OAS server 160, as defined by predefined online connection criteria.

When event-based proactivization techniques are optionally applied to the shares $\{K_{mid2}, K_{mid3}\}$ of the middle key 325 held by the OAS server 160 and the share $\{K_{mid4}\}$ of the middle key 325 held by the backup service 170, strong intrusion resilience is achieved. That is, every time the online secure container 300 is read and the middle container is retrieved from the OAS server 160, the inner key $K_{in}$ is rotated to a fresh new key $K_{in}'$ so that the new inner layer ciphertext is refreshed when the data is written back in the container. For a more detailed discussion of suitable proactivization techniques, see, for example, Amir Herzberg et al., "Proactive Secret Sharing Or: How to Cope with Perpetual Leakage," Proc. of the 15th Annual Int'l Cryptology Conf. on Advances in Cryptology, 339-352 (1995); U.S. patent application Ser. No. 13/600,641, filed Aug. 31, 2012, entitled "Multi-Server Authentication Using Proactivization;" and/or U.S. patent application Ser. No. 13/600,676, filed Aug. 31, 2012, entitled "Multi-Server Authentication Using Personalized Proactivization," (now U.S. Pat. No. 9,292,671), each incorporated by reference herein.

In a further variation, the OAS server 160, 260 digitally signs the returned middle container or a challenge nonce provided by the device 110, where the signature is computed also over a fresh timestamp. This time-stamped signature can serve as a verified proof of the property of provable online access, as discussed further below in conjunction with FIG. 10.

Figure 7:
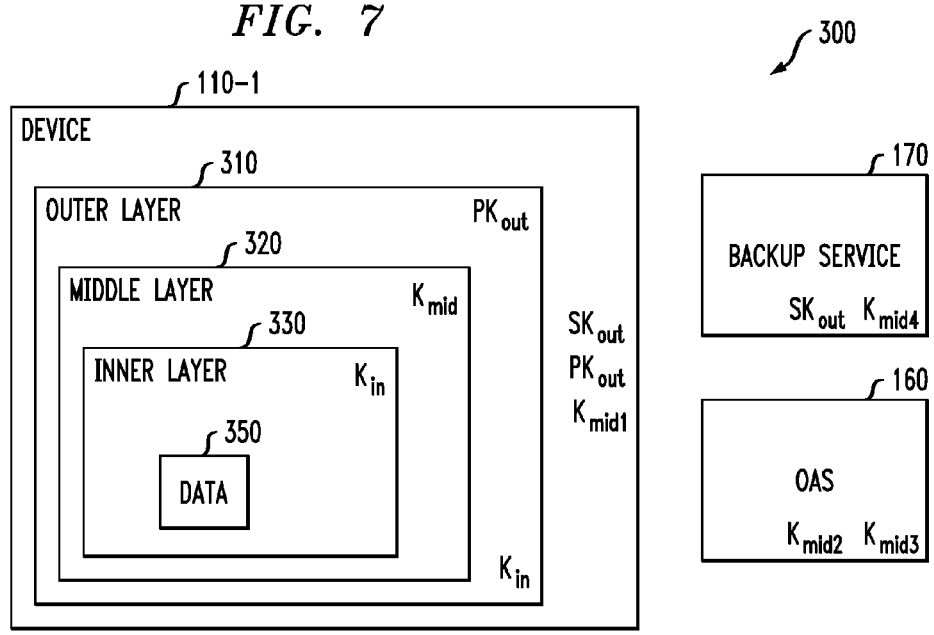
FIG. 7 illustrates an exemplary key structure and distribution for outer layer protection of the exemplary online secure container of FIG. 3.

FIG. 7 illustrates an exemplary key structure and distribution for outer layer protection 310 of the exemplary online secure container 300. Generally, the outer layer protection 310 allows the device to recover after a loss while concealing the inner key 335 (e.g., a symmetric key $K_{in}$) from the third party cloud backup service 150. As previously noted, the outer layer protection 310 is processed only on the device 110 in the exemplary embodiment.

As shown in FIG. 7, the exemplary outer layer protection 310 employs an asymmetric key pair (public key, $PK_{out}$; secret key, $SK_{out}$), where the outer key 315 (e.g., public key, $PK_{out}$) that protects the outer layer 310 and the secret key, $SK_{out}$, used for recovery, are both stored in the key store of the device 110. In addition, a copy of the secret key, $SK_{out}$, used for recovery is stored by the backup service 170. The exemplary asymmetric key pair (public key, $PK_{out}$; secret key, $SK_{out}$) can be randomly generated at the device 110 (e.g., using RSA encryption or elliptic curve (EC) encryption).

Recovery Process

When a device 110 is lost, the user can recover any lost device-centric online secure containers as follows. The user downloads a backup copy of lost device-centric online secure containers from the third party backup service 150 to the new device, and downloads, after proper authentication, the key $SK_{out}$ from the backup service 170 to unlock the outer layer encryption 310 and obtain the middle layer ciphertext and the inner layer key $K_{in}$. Then, a special read operation is performed similar to the one discussed further below in conjunction with FIG. 11, at the end of which the device 110 retrieves the inner layer ciphertext of the container, but where the middle layer key $K_{mid}$ is reconstructed by the OAS server 160 using a combination of the two split-key shares $\{K_{mid2}, K_{mid3}\}$ of the OAS server 160 and the split-key share $K_{mid4}$ of backup service 170 instead of the split-key share $K_{mid1}$ of the device 110. The OAS server 160 computes and returns to the device 110 the lost device share $K_{mid1}$.

Then, once the protected content of the lost device-centric online secure container has been recovered by the device 110, and possibly used by the user, this content will be again locked into the container through a special write operation, similar to the one discussed further below in conjunction with FIG. 12, in which the outer layer encryption key and preferably also the inner layer encryption key and the middle layer encryption key are refreshed to new random keys. That is, the device 110 creates a new inner key $K_{in}$ and encrypts the content of the container content with the new inner key $K_{in}$, sends the inner layer ciphertext to the OAS server 160, creates a new key pair ($PK'_{out}, SK'_{out}$) and sends the key $SK'_{out}$ to the backup service 170.

The OAS server 160 computes and returns to the device 110 the encryption of the received inner layer ciphertext, preferably under a refreshed new randomly chosen middle key which is split into the required number of four new fresh shares $\{K'_{mid1}, K'_{mid2}, K'_{mid3}, K'_{mid4}\}$, in which case the two shares $\{K_{mid2}, K_{mid3}\}$ of the OAS server 160 and the share $K_{mid4}$ of the backup service 170 are appropriately updated to the new fresh corresponding shares $\{K'_{mid2}, K'_{mid3}, K'_{mid4}\}$ and the new device share $K'_{mid1}$ is sent to the device 110 along with the returned middle layer ciphertext. Above, the device 110 is assumed to communicate to the backup service 170 separately, but alternatively both such interactions with the backup service 170 (to retrieve the old secret key $SK_{out}$ and to update the new secret key $SK'_{out}$) can be performed through the OAS server 160, for instance, in conjunction with FIG. 1, where the device 110 has direct communication only with the OAS server 160.

Finally, in one exemplary embodiment, for the above recovery process to be effective, any time a key of the container corresponding to the inner, middle or outer layer encryption is being refreshed, a copy for the container (outer layer ciphertext) must be sent to the third party backup service 150 so that recovery can be feasible with respect to the most recent keys that protect the content of the current version of the container.

Cloud-Centric Online Containers

Figure 8:
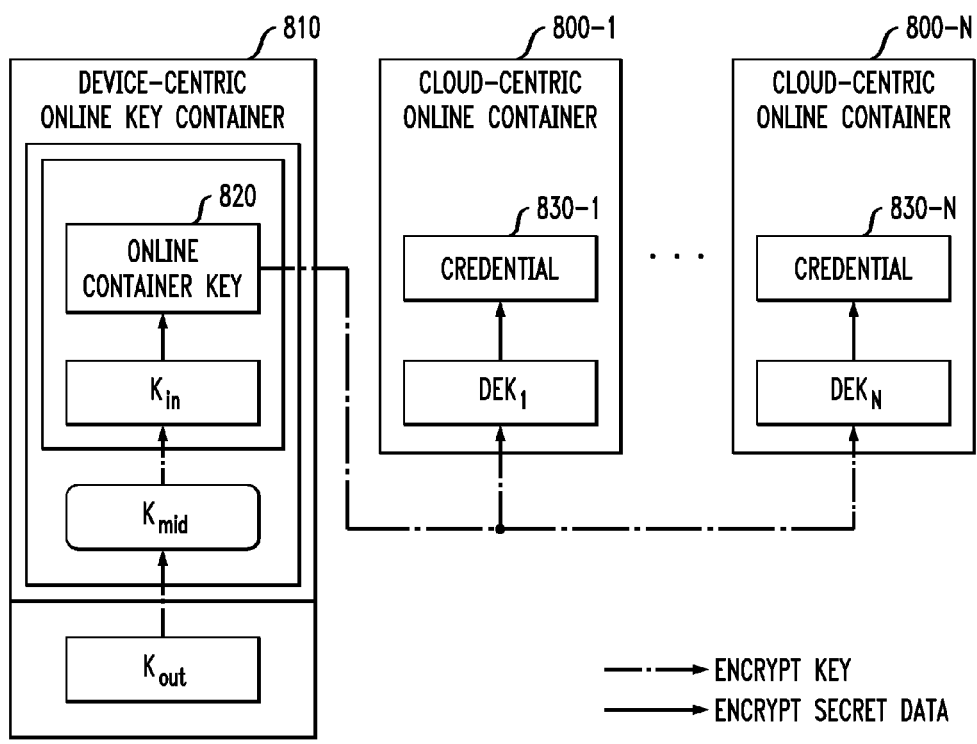
FIG. 8 illustrates a plurality of cloud-centric online containers that are accessed using an online container key obtained from a device-centric online container of a device.

FIG. 8 illustrates a plurality of cloud-centric online containers 800-1 through 800-N that are accessed using an online container key 820 obtained from a device-centric online key container 810 of a device 110 (not shown). In the notation used herein, dashed lines indicate an encryption of a key or an encryption layer of a container, while solid lines indicate an encryption of the data content of a container.

In the exemplary implementation of FIG. 8, there is one cloud-centric online container 800-1 through 800-N for each credential 830-1 through 830-N to be protected. The cloud-centric online containers 800 are stored by the server of FIG. 2 (not shown in FIG. 8).

Data content (credential 830-$i$) in each cloud-centric online container 800-$i$ is encrypted against a symmetric key called a data encryption key (DEK$_i$), which is stored in encrypted form at each cloud-centric online container 800-$i$.

The cloud-centric online containers 800-1 through 800-N are encrypted against a symmetric key (online container key 820) stored at the device-centric online key container 810. The device-centric online key container 810 is thus protecting the online container key 820 encrypted against a device-specific secret (inner key, K$_{in}$). In this manner, the data encryption keys (DEK$_i$) of cloud-centric online containers 800-$i$ are encrypted under the common symmetric key (online container key 820) stored at the device-centric online key container 810.

The exemplary device-centric online key container 810 protects the online container key 820 by employing the exemplary three-layer nested encryption, as discussed above in conjunction with FIGS. 3-7. Thus, the middle key K$_{mid}$ is a split key managed by the OAS server 160. The outer key K$_{out}$ is stored in the key store of device 110.

Online Secure Containers and Offline Containers for Two-Level Protection of Data Device-centric online secure containers 300 have been discussed above in conjunction with FIGS. 3-7 and cloud-centric online secure containers 800 have been discussed above in conjunction with FIG. 8. In both device-centric online secure containers 300 and cloud-centric online secure containers 800 the protected data 350, 830, respectively, can be accessed only when the device 110 is online with the OAS server 160 and when the predefined online connection criteria are satisfied. For example, the predefined online connection criteria may require that the device 110 can only access corporate email if the network environment is secure, such as a connection to a particular WiFi. The device 110 may optionally be required to present one or more authentication factors as well.

An offline container, on the other hand, can be accessed by the user even when the device 110 is offline (or is online without satisfying the predefined online connection criteria). An offline container may be accessed when the user or device 110 provides any required authentication factors. Thus, a user should be able to access protected data stored in an offline container only when the device 110 is unlocked and the user has successfully entered any required authentication factors.

According to one aspect of the invention, the separation between online and offline containers is cryptographically enforced by requiring the participation of the OAS server 160, as well as the predefined online connection criteria.

Among other benefits, the presence of online secure containers and offline containers provides for two-level protection of data. Thus, in one exemplary embodiment, data contents stored at a mobile device or accessed through a mobile device can be partitioned into two data types:
 1. Secure data, protected by offline secure containers; and
 2. Highly secure data, protected by online secure containers.

Naturally, assuming that correct and fresh interaction with the designated server OAS provides higher assurance about the operation setting of the mobile device, online secure containers can protect more sensitive data contents, thus achieving a layered, more flexible, access control framework.

Figure 9:
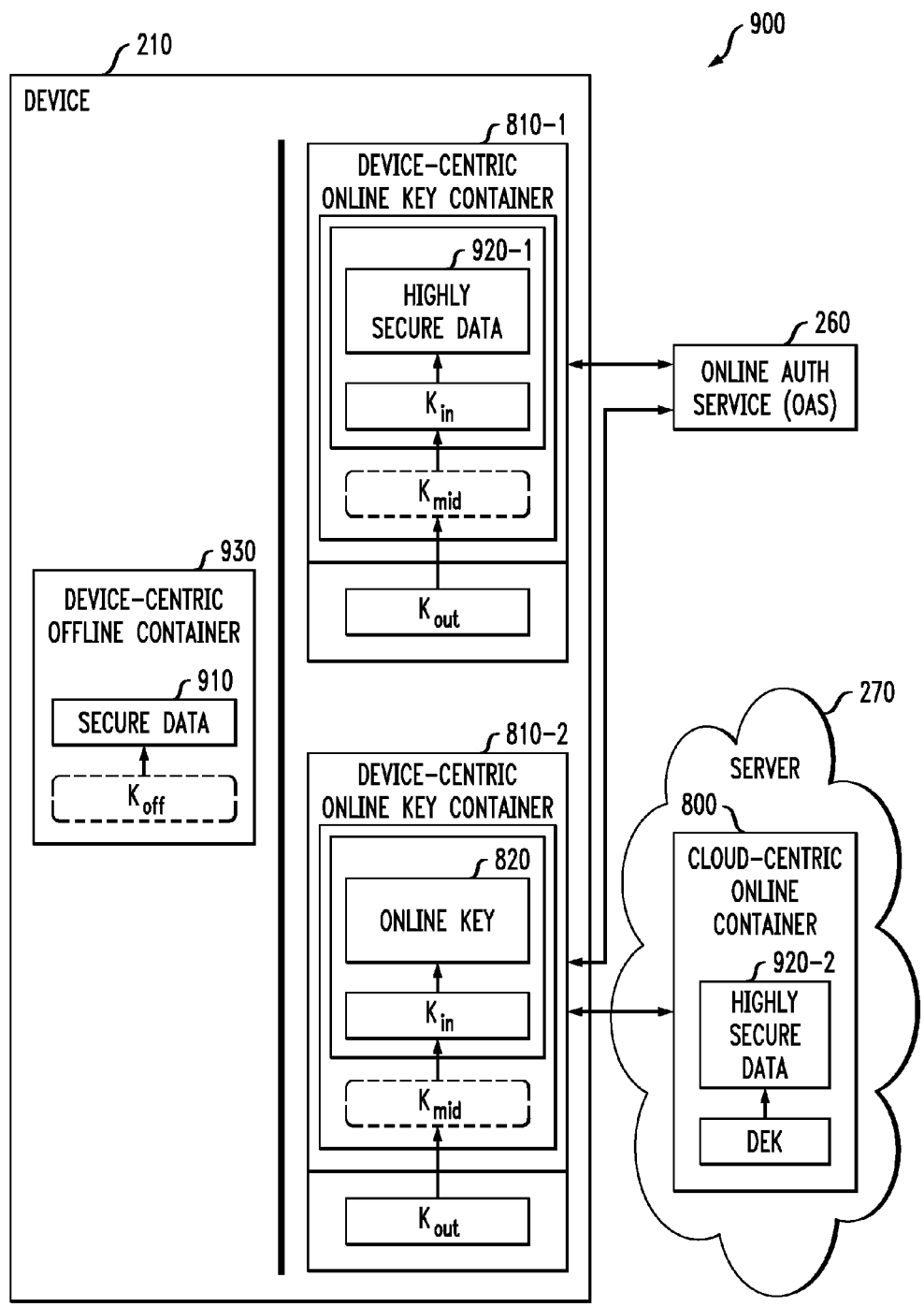
FIG. 9 illustrates an exemplary network environment for two-level protection of two exemplary classes of data in accordance with aspects of the invention.

FIG. 9 illustrates an exemplary network environment 900 for two-level protection of two exemplary classes of data in accordance with aspects of the invention. Data is partitioned into secure data 910 and highly secure data 920. As shown in FIG. 9, an exemplary device 210, such as a mobile phone or tablet, is connected over a network (not shown) to an OAS server 260 and a server 270, in a similar manner as FIG. 2.

The secure data 910 can be stored in a cloud-centric offline container 930 accessed from the device 110. In addition, the highly secure data 920 can be stored in online secure containers 300, such as highly secure data 920-1 stored in a device-centric online secure container 810-1 and highly secure data 920-2 stored in a cloud-centric online secure container 800. Device-centric offline container 930 is protected through encryption by a symmetric encryption key K$_{off}$.

The device-centric online secure container 810-2, 810-2 and the cloud-centric online secure container 800 operate in a similar manner as described above in conjunction with FIG. 8.

In an alternate implementation, and more generally, the layered access control of FIG. 9 that is allowed by online secure containers, through a cryptographically enforced and, additionally, cryptographically verifiable property that the device is provably online, can be realized without a partition of the data into secure and highly secure data.

Figure 10:
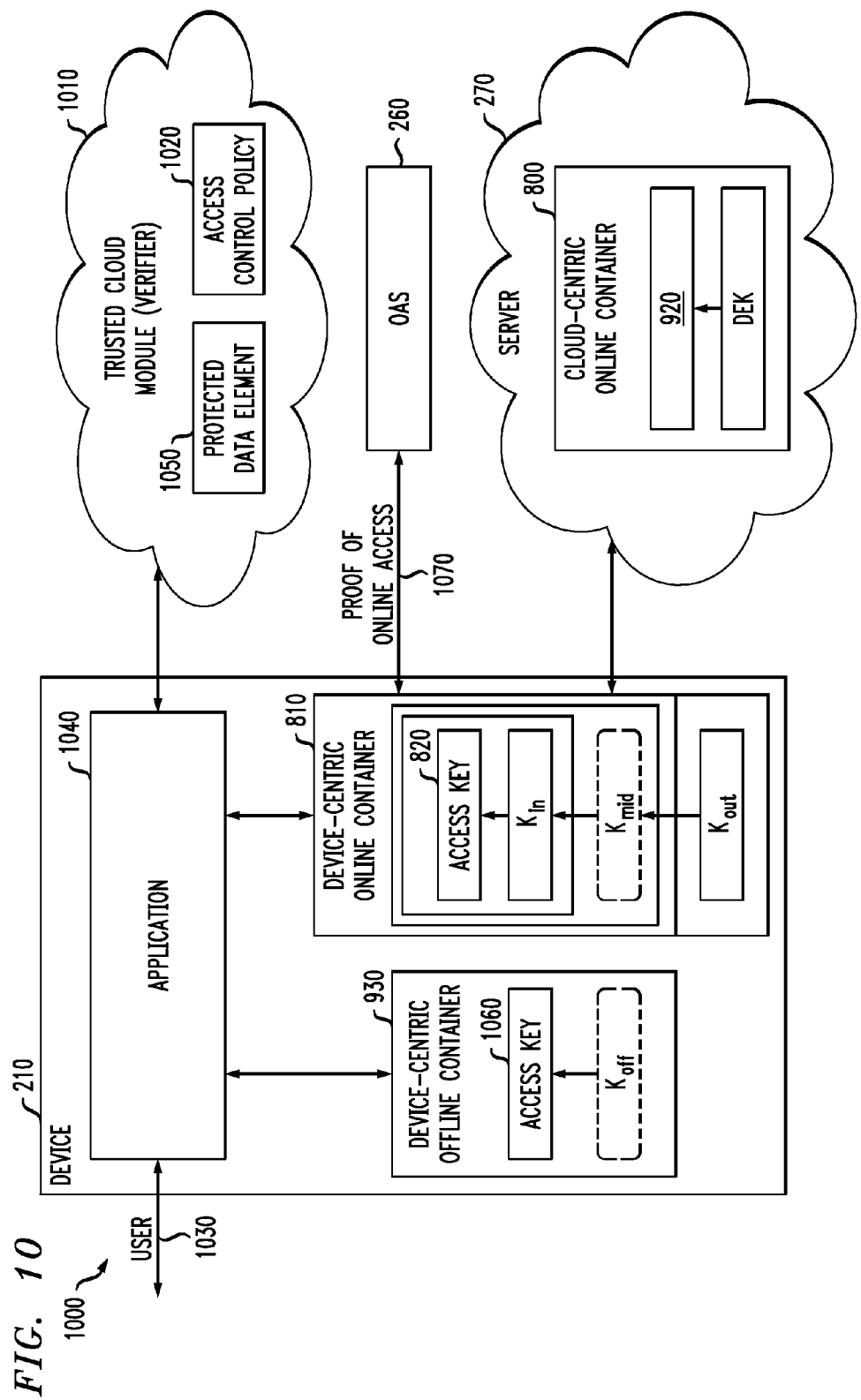
FIG. 10 illustrates an exemplary network environment for a layered access control for two-level protection of data that is dynamically classified into one of two exemplary classes.

FIG. 10 illustrates an exemplary network environment 1000 for a layered access control for two-level protection of data that is dynamically classified into one of two exemplary classes and does not require the data partitioning of FIG. 9. Rather, the embodiment of FIG. 10 employs a partition of the functionality over the data or environment of the requested access into secure and highly secure functions. Namely, data is stored, managed and controlled by a trusted cloud module 1010 that holds and maintains an access control policy 1020 that specifies which data units are labeled as highly secure for specific types of functionality over it or for specific environments at which the user or device is present at the time of the access request. In this manner, resources (e.g., data and/or services) are dynamically partitioned into secure and highly secure classes.

As discussed hereinafter, one or more device-centric or cloud-centric online containers 810, 800 can be employed to access resources having a highly secure class and one or more cloud-centric offline containers 930 can be employed to access resources having a secure class.

For example, the access control policy 1020 may specify writing to a data unit may be labeled as a highly secure functionality, or any operation on a stored password that is requested by an unknown Internet Protocol (IP) address is a highly secure function, or any request during not business hours, should be labeled as a highly secure request. Then, access to such functionalities or requests is granted only if, along with the reconstructed key, a verifiable proof 1070 that the device is online is provided to the cloud module. That is, verifiable "online" labels of the key reconstruction are provided by the reconstruction mechanism, and these can only be provided when the device is online.

In one exemplary implementation, resources dynamically classified as highly secure resources are only granted access when online access proof 1070 is provided and verified in accordance with the predefined online connection criteria. Such online access proof 1070 may, for instance, be provided as a fresh cryptographic attestation or a signature computed over a fresh timestamp, as was described previously in conjunction with FIG. 6.

As shown in FIG. 10, and as discussed further below, when a user 1030 employs an application 1040 to access a given protected data element 1050 that is protected by a particular access key 820, 920, 1060, access control policy 1020 dynamically decides whether the protected data element 1050 is labeled as highly secure and, therefore, access to the given protected data element 1050 requires a proof of online access 1070. Accordingly, any of the corresponding offline/online containers 930, 810, 800 storing the access key 1060, 820, 920, respectively, for the given protected data element 1050 can be used to reconstruct (unlock) this access key.

Advantageously for distinguishing between the offline and online key reconstruction described herein, only the online container 810 can additionally provide the required proof of online access 1070 provided by the OAS server 260. In the case of the device-centric offline container 930, the container 930 is opened and the stored access key 1060 is revealed using the corresponding encryption key $K_{off}$ but proof of online access 1070 does not have to be provided to the application 1040 and the verifier 1010. In the case of the device-centric online container 810, the stored access key 820 is revealed from the device-centric online container 810 if the multi-layer decryption succeeds and the predefined online connection criteria are satisfied, so that a proof of online access 1070 is obtained from the OAS server 260.

Alternatively, the required access key by access control policy 1020 for protected data element 1050 is stored at the cloud-centric online container 800 as its protected data content 920, in which case the access key 820 of online container 810 is required for unlocking access key 920, which in turn requires the multi-layer decryption of 820, if the predefined online connection criteria are satisfied, so that a proof of online access 1070 is obtained from the OAS server 260. In both cases, only the reconstruction of the access key 820, 920 with the online container 810, 800 can provide the required proof of online access 1070 for verifier 1010 to accept and to give the user 1030 the requested access to protected data element 1050.

Operations on Device-Centric Online Secure Container

The following exemplary registration process creates keys and results in an empty device-centric online secure container 810, or simply an online secure container 300, being created. The Online Authentication Service (OAS) 160, 260 is created and registered. The device 110 randomly generates the key pair, $PK_{out}$, $SK_{out}$, and the inner key, $K_{in}$. In addition, the device 110 creates the online inner container (i.e., data 350 protected by inner layer encryption 330) by encrypting some initial, possibly empty (i.e., default), data using the inner key, $K_{in}$. An authentication means is optionally used to authenticate the device 110 to the OAS server 160. The public key $PK_{out}$ is stored in the backup service 150.

Meanwhile, the OAS server 160 randomly generates $K'_{mid}$, the middle layer key that is optionally split as follows. Shamir's (3,4) secret sharing scheme is used to split $K'_{mid}$ into four shares. For example, the following equation can be employed: $g(x)=b_0+b_1x+b_2x^2 \mod v$. A well-known prime v is used whose bit length is larger than the size of an AES key, 256 bits. Let $b_0=K'_{mid}$. Then, $b_2$ and $b_1$ are randomly generated. A key derivation function (KDF) is used to convert $K'_{mid}$ to the actual online middle layer key used $K_{mid}$. Random x values are generated for all four shares and share values $K_{mid1}$, $K_{mid2}$, $K_{mid3}$, $K_{mid4}$ are calculated.

Then, the OAS server 160 stores $K_{mid2}$, $K_{mid3}$, x values for these shares and the x value for $K_{mid1}$, whereas the backup service 150 stores $K_{mid4}$ and the x value for this share and the x value for $K_{mid1}$. Finally, the inner container is encrypted using $K_{mid}$ to create the online middle container (middle layer encrypted data) and the online middle container and $K_{mid1}$ are returned to the device 160.

The device 160 then creates the online outer container (i.e., the final online container), using $PK_{out}$. The following values are stored in the final online container: the online middle container, $K_{in}$, and optionally, the authentication credentials for authentication to the OAS server 160. Also, the following values are stored in the device key store: $K_{mid1}$, and $PK_{out}$, $SK_{out}$.

FIG. 11 illustrates exemplary pseudo code for a read operation 1100 for a device-centric online container 810 in accordance with aspects of the invention. As shown in FIG. 11, the device 110 initially performs the following steps:

Extract $PK_{out}$ and $SK_{mid1}$, from the device key store;
Decrypt the online outer container using $SK_{out}$ and extract:
$K_{in}$
online middle container
possibly, the authentication credentials for authentication to the OAS server 160;
Possibly use an authentication means to authenticate to the OAS server 160; and
Send to the OAS server 160:
$K_{in}$
online middle container The OAS server 160 then performs the following steps:
Calculate $K'_{mid}$ using shares $K_{mid1}$, $K_{mid2}$ and $K_{mid3}$;
Use a key derivation function to convert $K'_{mid}$ to the actual online key used $K_{mid}$;
Decrypt the online middle container using $K_{mid}$ to obtain the online inner container, and then return the online inner container to the device 110.

Finally, the device 110 decrypts the online inner container using $K_{in}$ and gets the plaintext contents of the online container.

FIG. 12 illustrates exemplary pseudo code for a write operation 1200 for a device-centric online container 810 in accordance with aspects of the invention. As shown in FIG. 12, the Write Operation 1200 initially performs the steps of the Read Operation 1100 (FIG. 11), then the device 110 initially performs the following steps:

Extract $PK_{out}$ and $K_{mid1}$, from the device key store;
Generate a (fresh) random $K'_{in}$; and
Encrypt the plaintext using $K'_{in}$ to generate the online inner container. The device 110 then sends the following items to the OAS server 160:
$K_{mid1}$
Online Inner Container
The device 110 also possibly uses an authentication means to authenticate to the OAS server 160.

The OAS server 160 then performs the following steps:
Calculate $K'_{mid}$ using shares $K_{mid1}$, $K_{mid2}$ and $K_{mid3}$;
Possibly randomly refresh $K'_{mid}$ and shares $K_{mid1}$, $K_{mid2}$, $K_{mid3}$, $K_{mid4}$ and send $K_{mid4}$ to the backup service 150;
Use a key derivation function to convert $K'_{mid}$ to the actual online key used $K_{mid}$;
Encrypt the online inner container using $K_{mid}$ to generate the online middle container; and
Return the online middle container and (possibly refreshed) $K_{mid1}$ to the device 110.

The device 110 then performs the following steps:
  Encrypt the online middle container using $PK_{out}$, and store the following items in the final online container:
    (possibly refreshed) $K_{mid1}$
    online middle container
    Possibly the authentication credentials for authentication to OAS 260;
Finally, the device 110 stores the online outer container.

In the exemplary write operation 1200 of FIG. 12, the inner encryption layer key $K_{in}$ is proactively refreshed any time there is a write operation on the contents of the online secure container. This proactivization can be enforced to occur even during each read operation (for instance, simply by running a write operation immediately after a read operation, where the value written in the container is the exact value that was previously read from the container). Moreover, in the exemplary write operation 1200 of FIG. 12, the middle layer key $K_{mid}$ can be optionally proactivized. Moreover, as explained earlier in conjunction with FIG. 6 (but not shown in FIG. 12), in any write (or read) operation, the OAS server 160 can provide, along with the returned inner layer container, a signature on a fresh timestamp and possibly on some value provided by the device 110 (e.g., related to the device share $K_{mid1}$ itself). Optionally, the possible authentication means to authenticate the user or the device 110 to the OAS server 160 (possibly as part of the requirement that the online connection to the OAS server 160 satisfies one or more predefined online connection criteria) may leverage the device share $K_{mid1}$. Each such key proactivization of keys $K_{in}$ and $K_{mid}$, signature on a fresh timestamp, or authentication means protects against one or more types of replay attacks.

In the exemplary write operation 1200 of FIG. 12, there are two round trip communications. A first round trip communication is performed to read the vault and a second round trip communication is performed to write to the vault. This could optionally be improved by having multiple online containers, one per secret. The name of the secret stored in each container could be available separately. In this way, the device 110 could simply create a new online container when a value is being written to. The name of the container could be, for example, in plain text, a hash of the name, a salted hash of the name, or perhaps a time and memory hardened derived value.

Operations on Cloud-Centric Online Secure Container

FIG. 13 illustrates exemplary pseudo code for a read operation 1300 for a cloud-centric online container 800 in accordance with aspects of the invention. As shown in FIG. 13, the device 210 initially requests unlocking of an online key container from the OAS server 260 and a certain credential of a certain online container i from server 270. The OAS server 260 then verifies reconstruction of middle layer encryption key and notifies server 270 of successful authentication.

Thereafter, server 270 returns online container i (which is the container corresponding to the requested credential). The the device 210 decrypts the returned inner layer ciphertext of online container key using the device private key $K_{in}$ for the inner layer and gets the DEKi for online container i, and, finally, the device 210 decrypts the online container i using DEKi.

FIG. 14 illustrates exemplary pseudo code for a write/update operation 1400 for a cloud-centric online container 800 in accordance with aspects of the invention. As shown in FIG. 14, the device 210 initially unlocks the Online Container Key through the OAS server 260 in a similar manner as FIG. 13. The OAS server 260 then authenticates the request of device 210 to server 270.

If it is a write operation, then the device 210 creates a new Online Container N+1 using the Online Container Key.

If it is an update operation, then the device 210 performs the following steps:
  obtain existing Online Container N in a similar manner as FIG. 13; and
  update contents of Online Container N using Online Container Key.

The device 210 then uploads the Online Container N or N+1 to the server 270.

CONCLUSION

The foregoing applications and associated embodiments should be considered as illustrative only, and numerous other embodiments can be configured using the techniques disclosed herein, in a wide variety of different cryptography applications.

It should also be understood that online secure containers, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

Authentication processes in other embodiments may make use of one or more operations commonly used in the context of conventional authentication processes. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

The communication system may be implemented using one or more processing platforms. One or more of the processing modules or other components may therefore each run on a computer, storage device or other processing platform element. A given such element may be viewed as an example of what is more generally referred to herein as a "processing device."

Figure 15:
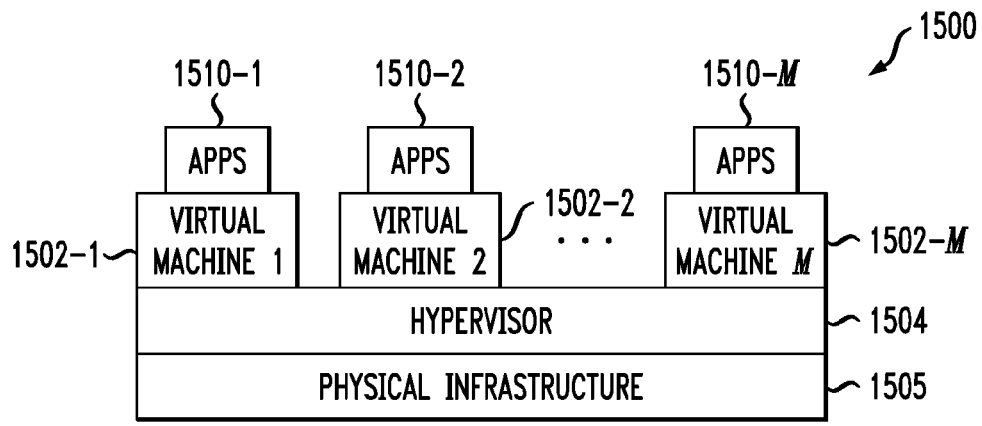
FIG. 15 illustrates an exemplary processing platform that may be used to implement at least a portion of one or more embodiments of the invention comprising a cloud infrastructure.

Referring now to FIG. 15, one possible processing platform that may be used to implement at least a portion of one or more embodiments of the invention comprises cloud infrastructure 1500. The cloud infrastructure 1500 in this exemplary processing platform comprises virtual machines (VMs) 1502-1, 1502-2, . . . 1502-M implemented using a hypervisor 1504. The hypervisor 1504 runs on physical infrastructure 1505. The cloud infrastructure 1500 further comprises sets of applications 1510-1, 1510-2, . . . 1510-M running on respective ones of the virtual machines 1502-1, 1502-2, . . . 1502-M under the control of the hypervisor 1504.

The cloud infrastructure 1500 may encompass the entire given system or only portions of that given system, such as one or more of client, servers, controller, authentication server or relying server in the system.

Although only a single hypervisor 1504 is shown in the embodiment of FIG. 15, the system may of course include multiple hypervisors each providing a set of virtual machines using at least one underlying physical machine.

An example of a commercially available hypervisor platform that may be used to implement hypervisor 1504 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the system.

Figure 16:
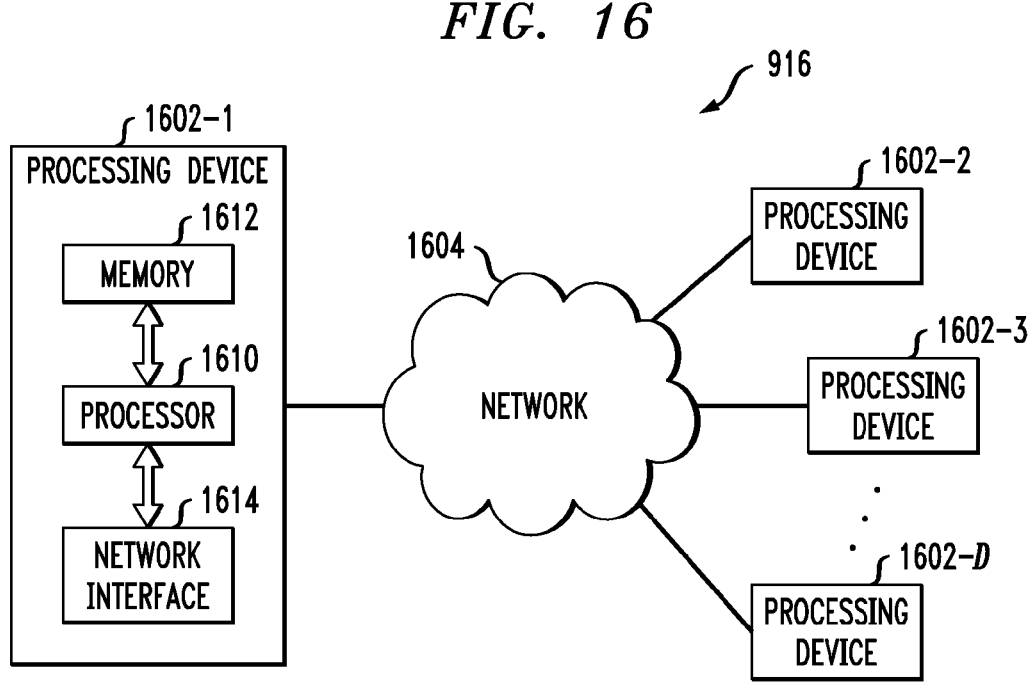
FIG. 16 illustrates another exemplary processing platform that may be used to implement at least a portion of one or more embodiments of the invention.

Another example of a processing platform is processing platform 1600 shown in FIG. 16. The processing platform 1600 in this embodiment comprises at least a portion of the given system and includes a plurality of processing devices, denoted 1602-1, 1602-2, 1602-3, . . . 1602-D, which communicate with one another over a network 1604. The network 1604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1602-1 in the processing platform 1600 comprises a processor 1610 coupled to a memory 1612. The processor 1610 may comprise a microprocessor, a microcontroller, an application specific integrated circuit (ASIC), a field programmable gate array (FPGA) or other type of processing circuitry, as well as portions or combinations of such circuitry elements, and the memory 1612, which may be viewed as an example of a "computer program product" having executable computer program code embodied therein, may comprise random access memory (RAM), read only memory (ROM) or other types of memory, in any combination.

Also included in the processing device 1602-1 is network interface circuitry 1614, which is used to interface the processing device with the network 1604 and other system components, and may comprise conventional transceivers.

The other processing devices 1602 of the processing platform 1600 are assumed to be configured in a manner similar to that shown for processing device 1602-1 in the figure.

Again, the particular processing platform 1600 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 15 or 16, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

It should again be emphasized that the above-described embodiments of the invention are presented for purposes of illustration only. Many variations and other alternative embodiments may be used. For example, the techniques are applicable to a wide variety of other types of cryptographic devices and authentication systems that can benefit from distributed cryptography using distinct value sets as disclosed herein. Also, the particular configuration of communication system and processing device elements shown herein, and the associated authentication techniques, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method performed by a device, comprising:
storing an encrypted container received from an online authentication service, wherein said encrypted container is encrypted using a first key stored by said online authentication service, wherein said encrypted container comprises a data item stored on said device;
transmitting said encrypted container using an online connection to said online authentication service to decrypt said encrypted container using said first key, wherein said encrypted container is decrypted by said online authentication service to provide a decrypted container only if said online connection satisfies one or more predefined online connection criteria specifying one or more required characteristics of said online connection between said device and said online authentication service;
receiving said decrypted container from said online authentication service; and
obtaining said data item from said decrypted container.

2. The method of claim 1, wherein said data item in said encrypted container is encrypted with a second key stored on said device and wherein said device decrypts said encrypted data item using said second key.

3. The method of claim 2, wherein said second key comprises a symmetric key stored on said device.

4. The method of claim 1, wherein said first key comprises a symmetric key stored by said online authentication service.

5. The method of claim 1, wherein said first key is split into a plurality of first key shares using a key splitting scheme.

6. The method of claim 5, wherein at least one of said first key shares is stored by one or more of said device in a device store of said device and a backup service.

7. The method of claim 5, wherein said transmitting said encrypted container further comprises said online authentication service reconstructing said first key.

8. The method of claim 5, wherein said first key is reconstructed by said online authentication service using one or more first key shares stored by said online authentication service and one or more first key shares stored by one or more of said device in a device store of said device and a backup service.

9. The method of claim 1, wherein said first key is protected using a proactivization technique.

10. The method of claim 2, wherein one or more of said encrypted container and second key stored on said device are encrypted using a third key.

11. The method of claim 10, wherein said third key comprises an asymmetric key pair stored in a key store of said device.

12. The method of claim 10, wherein a secret key of said asymmetric key pair is stored by a backup service.

13. The method of claim 1, wherein said data item comprises an authenticated data item.

14. The method of claim 1, wherein said data item comprises an online container key used to access at least one online container key used to access one or more cloud-centric online containers stored by one or more servers, wherein said one or more cloud-centric online containers store at least one cloud-centric data item.

15. The method of claim 14, wherein said one or more cloud-centric online containers are encrypted using said at least one online container key.

16. The method of claim 1, wherein said encrypted container stores data protected by a first security level and wherein an offline container stores data protected by a second security level, wherein said first security level is more secure than said second security level, wherein said offline container does not require an online connection that satisfies said one or more predefined online connection criteria.

17. The method of claim 1, further comprising the step of dynamically partitioning resources into at least two classes based on an access control policy, and wherein said encrypted container provides access to data of a first class and wherein an offline container provides access to data of a second class, wherein said data of said first class is protected by a first security level and said data of said second class is protected by a second security level, wherein said first security level is more secure than said second security level, and wherein said offline container does not require an online connection that satisfies said one or more predefined online connection criteria.

18. The method of claim 1, wherein said online authentication service provides a digital signature with said decrypted container, wherein said digital signature comprises a verifiable proof that said online connection satisfies said one or more predefined online connection criteria.

19. The method of claim 1, further comprising a recovery step that comprises the steps of:
obtaining a backup copy of at least one lost device-centric online secure container from a backup service to a new device;
obtaining an outer secret key SKout from the backup service to unlock an encryption of an outer layer of said at least one lost device-centric online secure container to reveal said encrypted container and an inner layer key $K_{in}$;
transmitting said encrypted container using said online connection to said online authentication service to decrypt said encrypted container using said first key, wherein said encrypted container is decrypted by said online authentication service to provide said decrypted container only if said online connection satisfies said one or more predefined online connection criteria;
receiving said decrypted container from said online authentication service;
decrypting an encryption of an inner layer of said at least one lost device-centric online secure container using said inner layer key $K_{in}$; and
obtaining said data item from said inner layer.

20. The method of claim 19, further comprising the step of encrypting each of said inner layer, said encrypted container and said outer layer using new versions of at least one of said inner layer key $K_{in}$, said first key and an outer public key PKout.

21. A non-transitory machine-readable recordable storage medium, wherein one or more software programs when executed by one or more processing devices implement the steps of the method of claim 1.

22. A method performed by an online authentication service, comprising:
receiving a container from a device, wherein said container comprises a data item stored on said device;
encrypting said container using a first key stored by said online authentication service to generate an encrypted container;
providing said encrypted container to said device;
receiving said encrypted container from said device for decryption using an online connection;
decrypting said encrypted container using said first key to obtain a decrypted container only if said online connection satisfies one or more predefined online connection criteria specifying one or more required characteristics of said online connection between said device and said online authentication service; and
providing said decrypted container to said device.

23. The method of claim 22, wherein said data item comprises an online container key used to access at least one online container key used to access one or more cloud-centric online containers stored by one or more servers, wherein said one or more cloud-centric online containers store at least one cloud-centric data item.

24. The method of claim 22, wherein said encrypted container stores data having a first security level and wherein an offline container stores data having a second security level, wherein said first security level is more secure than said second security level, wherein said offline container does not require an online connection that satisfies said one or more predefined online connection criteria.

25. The method of claim 22, further comprising the step of dynamically partitioning resources into at least two classes based on an access control policy, and wherein said encrypted container provides access to data of a first class and wherein an offline container provides access to data of a second class, wherein said data of said first class is protected by a first security level and said data of said second class is protected by a second security level, wherein said first security level is more secure than said second security level, and wherein said offline container does not require an online connection that satisfies said one or more predefined online connection criteria.

26. An apparatus, comprising:
a memory; and
at least one hardware device, coupled to the memory, operative to implement the following steps:
storing an encrypted container received from an online authentication service, wherein said encrypted container is encrypted using a first key stored by said online authentication service, wherein said encrypted container comprises a data item stored in said memory of said apparatus;

transmitting said encrypted container using an online connection to said online authentication service to decrypt said encrypted container using said first key, wherein said encrypted container is decrypted by said online authentication service to provide a decrypted container only if said online connection satisfies one or more predefined online connection criteria specifying one or more required characteristics of said online connection between said device and said online authentication service;

receiving said decrypted container from said online authentication service; and obtaining said data item from said decrypted container.

27. An apparatus, comprising:

a memory; and at least one hardware device, coupled to the memory, operative to implement the following steps:

receiving a container from a device, wherein said container comprises a data item stored on said device;

encrypting said container using a first key stored by said online authentication service to generate an encrypted container;

providing said encrypted container to said device;

receiving said encrypted container from said device for decryption using an online connection;

decrypting said encrypted container using said first key to obtain a decrypted container only if said online connection satisfies one or more predefined online connection criteria specifying one or more required characteristics of said online connection between said device and said online authentication service; and providing said decrypted container to said device.

* * * * *